United States Patent [19]

Doyle, Jr.

[11] 4,176,592

[45] Dec. 4, 1979

[54] SKEWER

[76] Inventor: Charles E. Doyle, Jr., 940 Sargent, SE., Ada, Mich. 49301

[21] Appl. No.: 885,292

[22] Filed: Mar. 10, 1978

[51] Int. Cl.² .......................................... A47J 37/04
[52] U.S. Cl. ................................... 99/419; 99/421 A
[58] Field of Search ...................... 99/419, 420, 421; 16/118, 119, 120

[56] References Cited

U.S. PATENT DOCUMENTS

| | | | |
|---|---|---|---|
| 272,472 | 2/1883 | Post | 16/120 |
| 381,356 | 4/1888 | Gaitley | 16/120 |
| 2,430,242 | 11/1947 | Nichols | 99/419 X |
| 2,483,546 | 10/1949 | Kaminski | 99/419 X |
| 2,535,548 | 12/1950 | Porter | 99/421 A |
| 2,838,990 | 6/1958 | Stiburski | 99/419 |
| 3,028,801 | 4/1962 | Watts | 99/419 |
| 3,734,740 | 5/1973 | Zenos | 99/421 HH X |

FOREIGN PATENT DOCUMENTS

| | | | |
|---|---|---|---|
| 135321 | of 1949 | Australia | 99/421 A |
| 1104067 | of 1955 | France | 99/419 |

*Primary Examiner*—Harvey C. Hornsby
*Assistant Examiner*—Arthur O. Henderson
*Attorney, Agent, or Firm*—John E. McGarry

[57] ABSTRACT

A skewer for shish-ke-bob and the like comprises a cylindrically shaped handle having circumferential grooves and a concave recess near one end to provide a grip for a human hand. A shaft extends from one end of the handle. The shaft has a free pointed end and a small flange extending from the pointed end. A second shaft has one of its ends coiled about the first shaft for slidable movement with respect to the first shaft. The little flange prevents the second shaft from sliding off the first shaft. The flange can be threaded through the coil to detach the second shaft from the first shaft. A plate marker having apertures therethrough slides over both shafts. The plurality of apertures have distinctive markings. The plate is slidable along the shafts for pushing food off of the skewer shafts.

3 Claims, 9 Drawing Figures

SKEWER

BACKGROUND OF THE INVENTION

1. Field of the Invention

This invention relates to skewers, more particularly the skewers adapted for shish-ke-bob and the like.

2. Description of the Prior Art

Since ancient times, man has enjoyed his food cooked over an open fire. He has also liked to cook small bits of food over an open fire. The problem with cooking small bits of food is that the food is hard to handle and the fire can easily burn a person's arms and hands if the person gets too close to the fire. The advantage of skewers is that the food can be mounted thereon and so that it could all be handled at one time. The skewer also provides a handle which can be kept away from the fire so that the cook does not have to burn his hand. The single-shaft skewers, however, do not adequately grip the food bits to prevent them from rotation about the skewer shaft so that uneven cooking would result as the heavier side of the food would always tend to be weighted toward the fire.

Extendible skewers also have been commercially available. These extendible skewers have a second shaft slidably mounted to the first shaft of the skewer. A two-shafted skewer is needed to provide for convenient cooking and provide easy detachment of the shafts for easy and safe cleaning.

SUMMARY OF THE INVENTION

According to the invention, a skewer has a handle and two parallel shafts extending from the handle. Each shaft has a pointed flange. The shafts are spaced apart a distance so that food chunks can be skewed through each shaft. A food removal means is slidably mounted to both shafts for manual movement from a position close to the handle to the pointed ends of the shaft for pushing the skewered food off the skewer.

Preferably, the food-removal means includes a plate having at least two apertures therethrough wherein the apertures are spaced apart to align simultaneously with both skewer shafts and are sized to receive the shafts.

Preferably, the plate has one central aperture and a plurality of circumferentially spaced apertures about the central aperture. Each circumferentially spaced aperture is spaced from the central aperture a distance equal to the spacing of the two shafts. The plate has a distinguishing marking adjacent each circumferentially spaced aperture for aiding in the easy identification of the individual skewers. The two shafts are extendible through the central aperture and the desired circumferentially spaced aperture for identification of the particular skewer.

Further according to the invention, means slidably mount the second shaft at one end thereof to the first shaft for longitudinal sliding movement of the second shaft with respect to the first shaft. In addition, means prevent the second shaft from sliding off the pointed ends of the first shaft.

Preferably, the means for slidably mounting the second shaft to the first shaft includes the second shaft having a coiled end with a plurality of coils snugly wrapped about the first shaft.

Desirably the means for preventing the second shaft from sliding off the pointed end of the first shaft includes a radially extending flange at the pointed end of the first shaft which abuts the coils and stops the coils from extending further along the first shaft.

Preferably, the skewer has means for removing the second shaft from the first shaft. In one embodiment, means for removing the second shaft includes the coils forming a threaded passage through which the flange of the first shaft can be threaded as the first shaft is rotated with respect to the second shaft.

In one embodiment, the handle is axially mounted at one end of the first shaft. The handle is substantially cylindrical in shape and has a convex portion near the mounted end to aid a person to grip the handle by thumb and finger placed in the convex position while the rest of the handle is positioned in the person's palm. Circumferential grooves placed on the substantially cylindrical handle promote a secure grip of the handle.

In this fashion, a skewer can be used to provide even cooking to any skewered foods along with easy removal of the food, easy identification of a specific skewer and easy removal of the second shaft from the first shaft for cleaning purposes.

BRIEF DESCRIPTION OF THE DRAWINGS

Reference now will be made to the following drawings.

DETAILED DESCRIPTION OF THE PREFERRED EMBODIMENT

Figure 1:
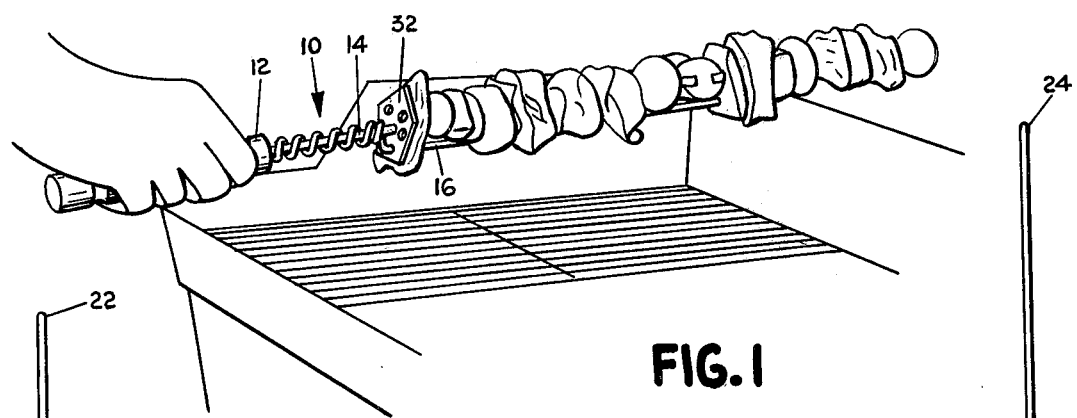
FIG. 1 is a perspective view of an embodiment of the invention in a preferred setting.

Referring to FIG. 1, a skewer 10 has a handle 12, a shaft 14 rigidly connected to the handle and extending outwardly therefrom and a second shaft 16 spaced away from shaft 14 and parallel thereto.

Figure 2:
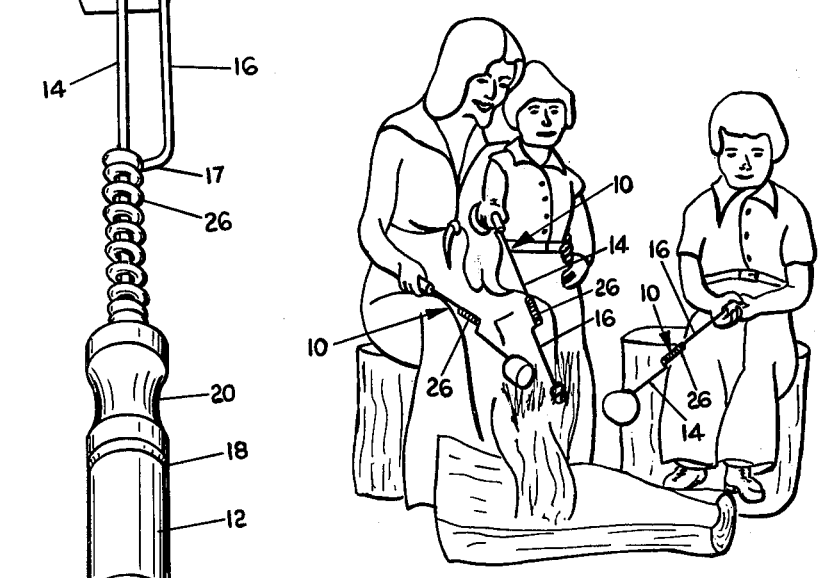
FIG. 2 is a perspective view of the skewer shown in FIG. 1.

The skewer as shown in FIG. 2, the handle 12 is circumferential in shape and has a plurality of lateral grooves 18 and a concave recess portion 20 to promote a grip between the forefinger and thumb. The first shaft has a pointed end 22 and the second shaft 16 has a pointed end 24. Shaft 16 has a coiled end 26 snugly coiled about shaft 14 for slidable movement with respect thereto.

Shaft 16 has a transverse bent section 17 which connects the straight portion of shaft 16 with the coiled end 26.

Figure 4:
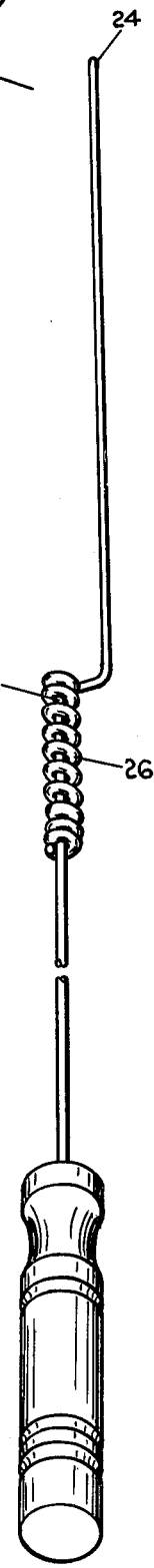
FIG. 4 is a view of the skewer shown in FIG. 2 in the extended position.

When the coiled end 26 is adjacent the handle 12, point 22 extends a few inches beyond point 24. However, point 24 can extend well beyond point 22 when the coil section 26 slides to the pointed end 22 on shaft 14. Such an extended position is shown in FIG. 4.

Figure 6:
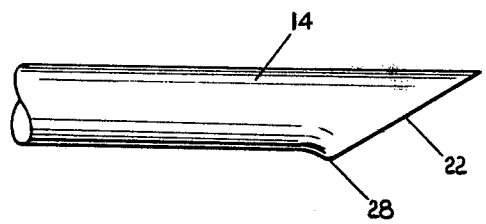
FIG. 6 is an enlarged side elevational view of the pointed end of the first shaft shown in FIG. 2.
Figure 7:
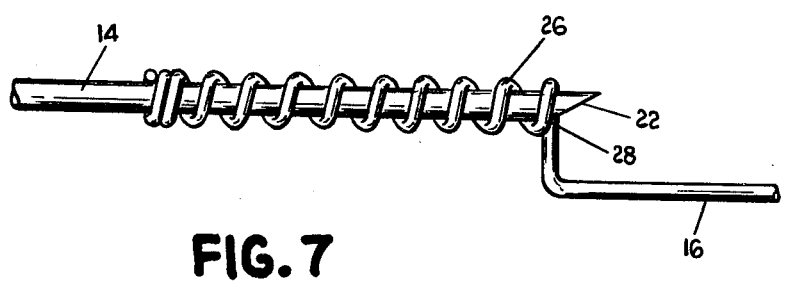
FIG. 7 is a fragmentary enlarged side elevational view of FIG. 4 showing the coiled section being retained on the first shaft by the flange on the pointed end of the shaft shown in FIG. 6.

As clearly shown in FIG. 6, the pointed end 22 has a small flange 28. Since the coiled end 26 has an axial opening which is equal to the circumference of the shaft 14, the flange 28 which extends beyond the circumference of the rest of the shaft 14 prevents the shaft 16 from sliding off from shaft 14.

Figure 8:
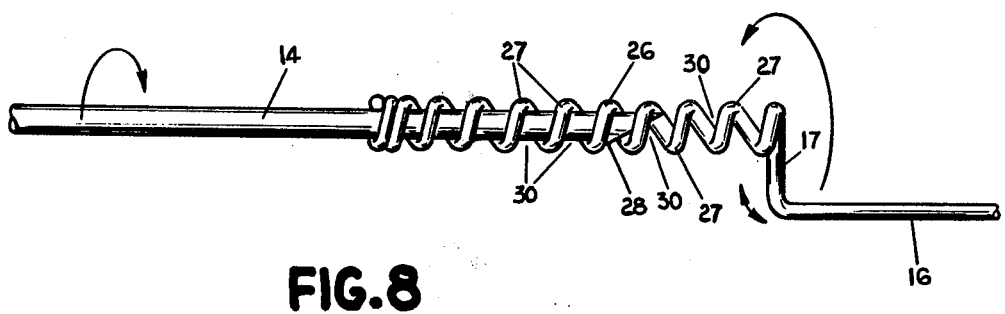
FIG. 8 is a side elevational view of the coil section of the second shaft and pointed end of the first shaft as the coil is being threaded off the first shaft in the embodiment shown in FIG. 2.

Referring to FIG. 8, the shaft 16 can be detached from shaft 14 by rotating the shaft 16 with respect to shaft 14. When relative rotation occurs, the flange 28 threads through the spacings 30 in between the individual coils 27 of the coiled end 26.

The transversely bent section 17 acts as a lever so that when shaft 14 is gripped, shaft 16 can rotate with respect to 14 by manual application of a torque by a thumb or palm onto the transverse section 17.

Figure 9:
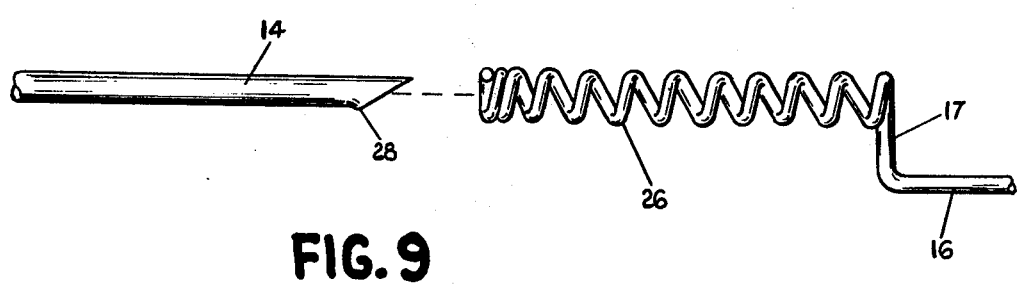
FIG. 9 is a side elevational view showing the coil section detached from the first shaft of the embodiment shown in FIG. 2.

The flange 28 threads completely through the coiled end 26 such that the shaft 16 becomes detached from shaft 14 as shown in FIG. 9.

Figure 3:
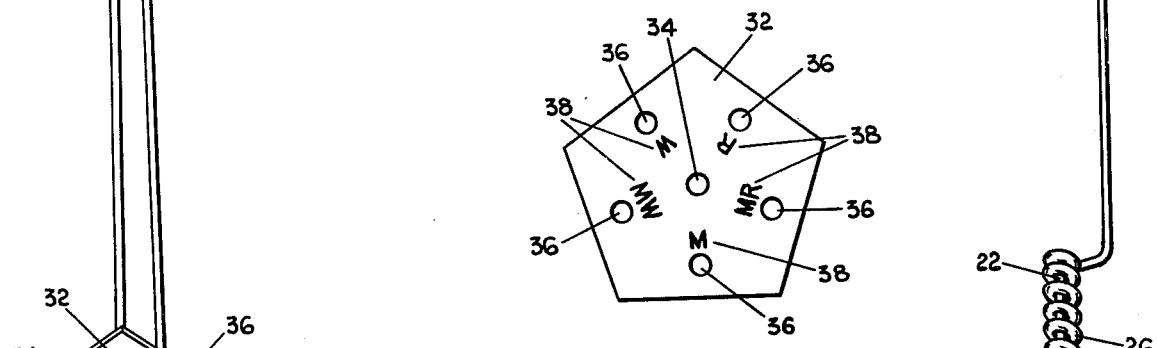
FIG. 3 is an elevational view of a plate attached to the skewer as shown in FIG. 2.

Referring back to FIG. 2, when the shafts 14 and 16 are slidably connected, a pentagon-shaped plate 32 slides on both shafts 16 and 14. Plate 32 as shown in FIG. 3 has a central aperture 34 and five apertures circumferentially placed about the central aperture 34. Each circumferential aperture 36 has a marking 38 adjacent thereto. The markings are the letters "R," "MR," "M," "MW" and "W." Each aperture 36 is equally spaced away from aperture 34 and is spaced the same distance apart as the two shafts 16 and 14. Each aperture 34 and 36 is sized to receive shafts 16 and 14. As shown in FIG. 2, shaft 14 extends through aperture 34 while shaft 16 extends through one selected aperture 36. The specific letter 38 adjacent the selected aperture 36 indicates if the food skewered on the specific skewers is to be rare, medium rare, medium, medium well or well.

In addition to marking how well done the food should be cooked, the plate 32 serves as a food remover. A person can grasp the plate 32 and the expansive portion of the plate, push the plate forward to the pointed ends to push off all the skewered food preceding the plate.

In operation, the plate 32 slides onto the shafts and then chunks of food such as shish-ke-bob pieces are skewered to both shafts 14 and 16 through the pointed ends 22 and 24. The loaded skewers are placed over a fire such as a barbeque grill as shown in FIG. 1 where the food is cooked. During the cooking, the handle 12 can be grasped for rotating the skewer. All the pieces of food rotate with the skewer since each piece is attachable to both shafts which prevents the food from rotating about a single shaft. When the skewered food is cooked, the handle 12 can be firmly grasped in one hand and the second hand with a protective glove or pad can push the plate 32 toward the points 22 and 24, pushing all the food off from the skewer.

Figure 5:
FIG. 5 is a view of the skewer shown in FIG. 4 shown in a preferred setting when in the extended position.

The skewer can also be used as a single shaft skewer over an open fire by extending shaft 16 out to the end of shaft 14. As shown in FIG. 5, the extra length allows the handle to be far enough away from the fire to prevent any burning of hands or arms.

If spare single-shaft skewers are needed, shaft 16 can be unthreaded from shaft 14 and both shafts 16 and 14 can be used as conventional single-shaft skewers. Also the removal of shaft 16 from shaft 14 allows for safe and easy cleaning of all parts.

In this fashion, an economical and multipurpose skewer can be used over charcoal grills or open fires and allows for easy removal of the food from the skewers.

Reasonable variation and modification are possible within the scope of the foregoing disclosure and drawings without departing from the spirit of the invention as defined by the appended claims.

The embodiments of the invention in which an exclusive property or privilege is claimed are defined as follows:

1. A skewer comprising:
   a handle;
   a first shaft mounted to the handle and extending straight to a pointed end;
   a second parallel shaft;
   means for slidably mounting the second shaft at one end thereof to the first shaft for longitudinal movement with the first shaft whereby the second shaft can extend beyond the end of the first shaft, the slidably mounting means including a second shaft having a coiled end with a plurality of coils snugly wrapped around the first shaft for slidable movement with respect thereto;
   the second shaft being spaced apart from the first shaft and having a pointed free end; and
   means for preventing the second shaft from sliding off the pointed end of the first shaft, the preventing means includes a flange at the end of the first shaft which abuts the coils when the second shaft is in an extended position with respect to the first shaft;
   means for removing the second shaft from the first shaft, including the coils forming a threaded passage through which the flange of the first shaft can thread as the first shaft is rotated with respect to the second shaft.

2. A skewer as defined in claim 1 wherein the handle is axially mounted at one end thereof to the end of the first shaft; the handle has a convex portion near the mounted end adapted to the gripped by a thumb and finger of a person.

3. A skewer comprising:
   a substantially cylindrical handle with a convex depression near one end thereof;
   a first shaft axially mounted at the end of the handle near the convex depression, the first shaft having a pointed free end and a radially extending flange at the pointed end;
   a second shaft having one coiled end with a plurality of coils snugly wrapped about the first shaft for sliding therealong, the coils abutting the flange when the second shaft is in an extended position with respect to the first shaft for preventing the coiled end from sliding off the pointed end of the first shaft;
   the opposite end of the second shaft having a point;
   the second shaft being spaced apart and substantially parallel to the first shaft;
   a transverse radially extending portion of the second shaft connecting the parallel portion to the coiled end;
   a plate having a central aperture and a plurality of secondary apertures spaced circumferentially about the central aperture;

the central aperture and each second ary aperture spaced apart a distance equal to the distance between the two shafts;

the central aperture sized to receive one shaft and secondary apertures sized to receive the other shaft;

the plate slidable along the shafts and adapted to abut food skewered on the shafts and manually movable to slide the food off the skewers;

markings on the plate adjacent each secondary aperture to distinguish each secondary aperture.

* * * * *